Patented Dec. 11 1923.

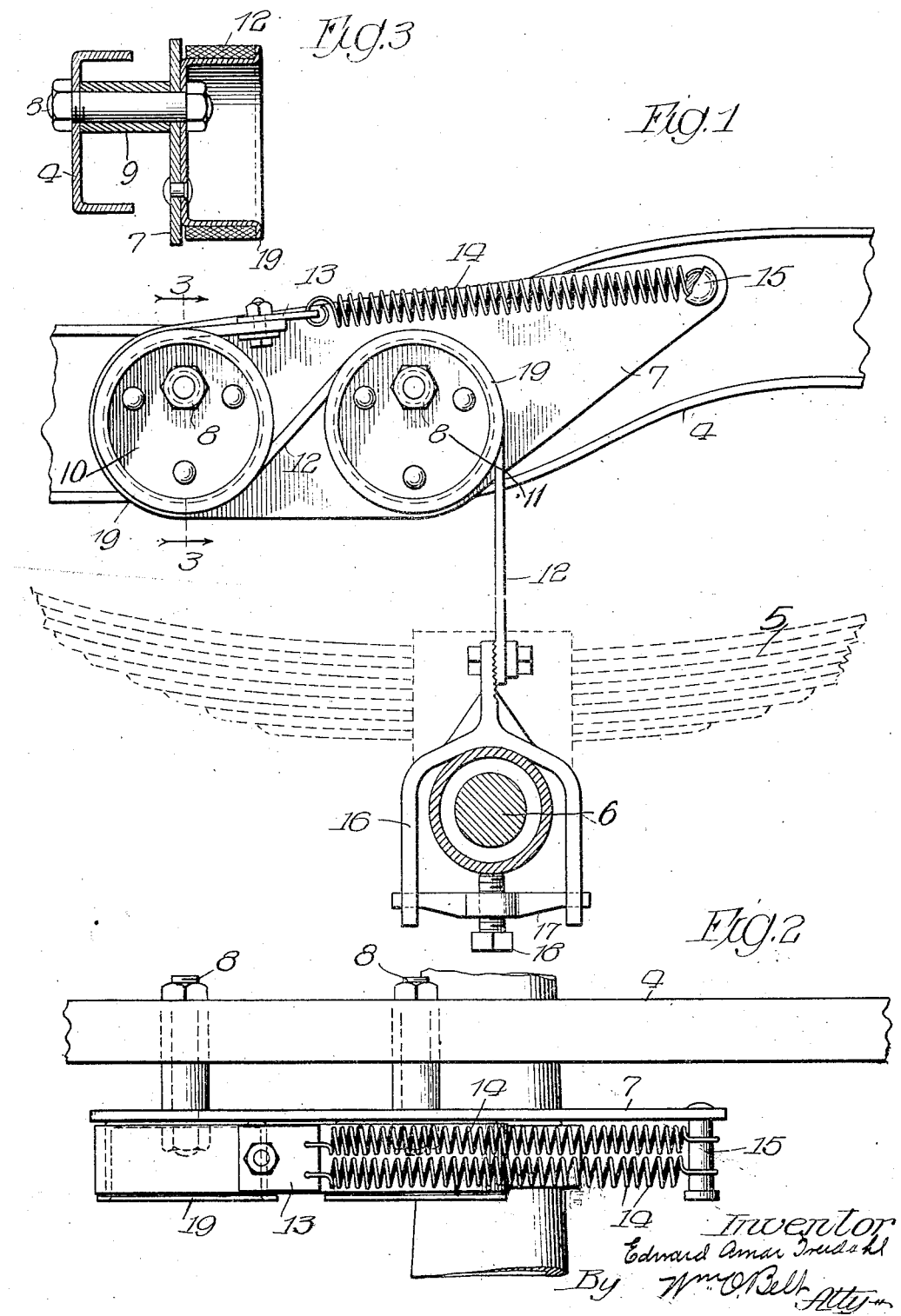

1,477,299

UNITED STATES PATENT OFFICE.

EDWARD ARNAR TVERDAHL, OF CHICAGO, ILLINOIS, ASSIGNOR OF ONE-HALF TO JOSEPH F. DAVIS, OF CHICAGO, ILLINOIS.

REBOUND-CHECK SHOCK ABSORBER.

Application filed October 23, 1918. Serial No. 259,416.

*To all whom it may concern:*

Be it known that I, EDWARD ARNAR TVERDAHL, a citizen of the United States, residing at Chicago, in the county of Cook and State of Illinois, have invented certain new and useful Improvements in Rebound-Check Shock Absorbers, of which the following is a specification.

This invention relates to that class of shock absorbers which are used principally on motor vehicles for the purpose of checking the rebound action of the springs.

The object of the invention is primarily to provide a device of this character which will effectually check the rebound of the springs and which can be readily and easily applied to most well known makes of motor vehicles, and possibly to all of them, with such changes and adaptations as may be necessary to adapt the invention thereto.

In the accompanying drawing I have illustrated a simple embodiment and adaptation of the invention in which Fig. 1 is a side elevation, partly in section, showing the invention applied to as much of the motor vehicle as is necessary to understand the construction and operation of the invention;

Fig. 2 is a top plan view and

Fig. 3 is a sectional view on the line 3—3 of Fig. 1.

Referring to the drawings, 4 is the frame, 5 the spring and 6 the rear axle housing of an automobile. A plate or bracket 7 is secured rigidly to the frame 4 by bolts 8 and spaced from the frame by suitable spacer sleeves 9 on said bolts. Two drums 10 and 11 are rigidly mounted on the plate in tandem relation substantially as shown in Fig. 1. I have found in practice that it is a satisfactory arrangement to have these drums mounted in substantially the same horizontal plane as shown in Fig. 1 but I do not regard this as an essential arrangement and reserve the right to vary therefrom as may be found satisfactory and desirable. A strap 12 is arranged almost entirely around the drum 10 and extends up between the drums and over the drum 11. The upper end of this strap is connected by a suitable clamp device 13 to the end of one or more coil springs 14 which are connected at the other end to a stud 15 on the bracket plate 7, this stud being preferably located at the forward end of the bracket plate in front and above the plane of the drums. The lower depending end of the strap is fastened by a suitable clamp device to a yoke 16 which encloses the housing of the rear axle and comprises a cross-bar 17 and a locking bolt 18. This yoke is preferably made of sufficient size for universal use on all forms of housings and in any suitable position on the housings so that said yoke may be made standard for general use. When the yoke is properly adjusted with relation to the drums the bolt 18 can be tightened to lock the yoke rigidly in set position on the housing. I have found it desirable to arrange the drums with relation to the rear axle housing in the manner illustrated in Fig. 1, the forward drum 11 being always directly above the housing to provide for a direct pull upon the strap between said drums and the yoke, but this arrangement may also be varied within reasonable limitations to adapt the invention to different constructions of motor vehicle assemblies.

In practice the parts are arranged as illustrated with the springs normally at tension so that the strap is taut and whenever the frame and axle are brought into closer relation the springs will automatically take up any slack that might otherwise come in the strap. This spring control friction strap traveling over the rigid drums 10 and 11 will prevent the normal tendency of the vehicle spring to rebound to normal position, which results in bouncing the body of the car and often in breaking one or more leaves of the vehicle springs. Thus it will be observed that as the vehicle spring, when flexed, tends to resume its normal position the friction strap will be pulled by the axle over the drums against the tension of springs 14 and with sufficient friction to prevent the rebound action referred to and to insure the return of the frame and rear axle to their normal relative positions by a steady, even movement which will avoid bouncing the body and the occupant of the car and prevent breakage of the spring leaves.

My invention is simple in construction and can be manufactured at low cost. The drums may be made by stamping and they are preferably provided at their outer edges with outturned flanges 19 to form, in conjunction with the bracket plate 7, guides to retain the friction strap in place on the drums and prevent accidental displacement of the strap.

My invention can be readily adapted and applied to the great majority, if not all, of the commercial makes of motor vehicles and to a very large extent, and possibly for all purposes, it can be made in standard form for general use. The invention is applied to that part of the motor vehicle assembly where space is always, so far as I am aware, left for action of the springs and this not only facilitates the application of the invention to a vehicle but also enables its universal use without necessitating any changes in the assembly.

I am aware that changes in the form and proportion of the parts and in the details of construction may be necessary to adapt the invention to different makes of motor vehicles, and I reserve the right to make all such changes as fairly fall within the scope of the appended claims although it is my belief that the invention may be made in a standard form for universal application to a great majority, if not all, of the well known commercial makes of motor vehicles.

I claim:—

1. A shock absorber comprising an attaching bracket, a pair of non-rotatable horizontally aligned drums carried by the front of the bracket, each drum being hollow and open at its outer end, fastening bolts extending through the drums and the bracket, the head of the bolts being housed within the hollow drums and accessible through the open outer ends thereof, spacer sleeves on the bolts and in rear of the bracket, a friction strap engaging the drums, one end of the strap depending from one of the drums and provided with means for connection with the axle of a vehicle, and a substantially horizontal helical spring having one end secured to the other end of the friction strap and its opposite end secured to the bracket, the drums, strap and spring all being in the same vertical plane.

2. A shock absorber comprising an attaching bracket, a pair of substantially horizontal non-rotatable drums carried by the bracket, a friction strap engaging the drums, a spring carried by the bracket and secured to one end of the friction strap, the other end of the friction strap depending from one of the drums, and means for connecting said depending end of the strap with the axle of a vehicle, said means including a yoke upon the depending end of the strap, a cross bar carried by the yoke, and a clamp screw carried by the cross bar, the drums, the strap, the spring, the yoke and the cross bar all being in the same vertical plane.

EDWARD ARNAR TVERDAHL.

Witnesses:
  J. W. Davis,
  M. A. Kiddie.